2,882,281
STEROIDAL SULFONIUM SALTS

Raymond M. Dodson, Park Ridge, and Paul B. Sollman, Skokie, Ill., assignors to G. D. Searle & Co., Chicago, Ill., a corporation of Delaware No Drawing. Application June 6, 1956
Serial No. 589,600

13 Claims. (Cl. 260—397.3)

The present invention relates to steroidal sulfonium salts. It is particularly concerned with compounds of the general structural formula

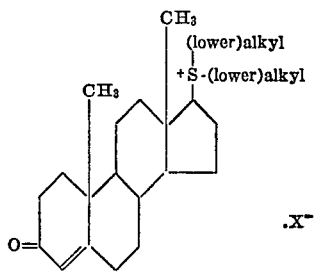

and with compounds of the general structural formula

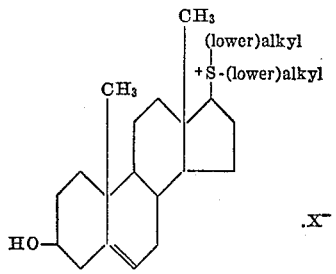

wherein X⁻ is one equivalent of a non-toxic anion. These general formulas are not to be interpreted as expressing limitations with respect to the configurations of the valence bonds directed from, or the groups bonded to, the sulfur atom, as there are comprehended in this invention stereoisomers of both the 17α and 17β series, as well as stereoisomers which can result when the designated alkyl groups are not identical.

In the foregoing structural representations the lower alkyl groups can be selected from among straight- and branched-chain alkyl radicals containing fewer than nine carbon atoms. In the preferred embodiments of this invention at least one of the lower alkyl radicals is methyl.

Suitable starting materials for the manufacture of compositions of the present invention are the 17-alkylthio-5-androsten-3-ols described in our copending application, Serial No. 485,606, filed February 1, 1955, now U.S. Patent No. 2,753,361, and the 17-alkylthio-4-androsten-3-ones, described in our copending application, Serial No. 491,507, filed March 1, 1955, now U.S. Patent No. 2,763,669.

Upon reaction of a thioether of one of the designated classes, suitable in an inert organic solvent, with a lower alkyl halide, there is obtained a sulfonium salt of the type described and claimed herein. In the selection of reaction conditions for sulfonium salt formation, relatively mild conditions are employed when the substituent at steroidal position 17 is a methylthio group and the alkyl halide is methyl iodide, whereas progressively more drastic conditions, such as higher temperatures and longer heating periods, are advisable when either of the alkyl groups is other than methyl, or the halogen atom is bromine, or especially chlorine. Representative reaction conditions are set forth more fully in the examples to follow.

It will be apparent that the lower alkyl groups attached to the sulfur atom of the sulfonium salts are equivalently bonded to the sulfur atom, regardless of the convention by which the compounds are named. For example, a typical sulfonium salt of this invention, representable by the structural formula

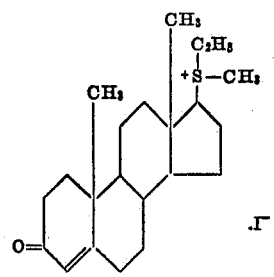

can be named as 17β-methylthio-4-androsten-3-one ethiodide, as 17β-ethylthio-4-androsten-3-one methiodide, or as (3-oxo-4-androsten-17β-yl)methylethylsulfonium iodide.

Other sulfonium salts comprehended herein can be manufactured by the reaction of the corresponding sulfonium halide with a reagent favorable to anion interchange. Thus, by reaction of 17β-methylthio-4-androsten-3-one methiodide with silver sulfate in aqueous medium there occurs a precipitation of silver iodide, and (3-oxo-4-androsten-17β-yl)dimethylsulfonium sulfate is recovered from the aqueous solution. Upon admixture of aqueous solutions of this compound with stoichiometric quantities of water-soluble barium salts, there occurs precipitation of barium sulfate and the formation of other sulfonium salts of this invention.

The compositions of the present invention are valuable therapeutic agents because of their relatively high water solubility and their selective pharmacological actions. They have valuable antibacterial properties and are effective, for example, against *Bacillus subtilis*. These sulfonium salts are anticholinergic agents capable of blocking the transmission of nerve impulses across the autonomic ganglia, and because of this property are valuable in the treatment of ulcers and other gastrointestinal dysfunctions associated with autonomic hyperactivity. They have anti-fibrillatory properties, and restore normal cardiac rhythm in conditions of atrial arrhythmia.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

Example 1

A solution prepared from 24 parts of 17α-methylthio-5-androsten-3β-ol, 195 parts of butanone, and 205 parts of methyl bromide is placed in a tightly sealed reaction vessel, and allowed to stand for 16 hours at 65° C. The material which crystallizes from the solution is removed by filtration and is recrystallized from water. It is further purified by dissolving it in 1000 parts of hot alcohol and precipitating by the addition of 1000 parts of peroxide-free ether. This compound is 17α-methylthio-5-androsten-3β-ol methobromide. It melts with decomposition at 188–189° C. and has the following structural formula

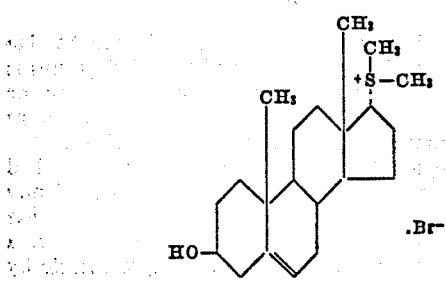

Example 2

Methanol (80 parts) maintained at about 25° C. is saturated with methyl chloride; 17α-methylthio-4-androsten-3-one (3 parts) is added, and the resulting reaction mixture is heated in a high pressure reaction vessel at about 100° C. for 18 hours. The contents of the vessel are then cooled, concentrated to about 10% of the original volume, and diluted with 210 parts of ether. The insoluble reaction product is collected and crystallized from water, whereby there is obtained 17α-methylthio-4-androsten-3-one methochloride which is soluble in water, methanol, and ethanol, but is insoluble in ether and other non-polar organic solvents. It exhibits infrared absorption maxima at about 6.0 and 6.2 microns, and has the structural formula

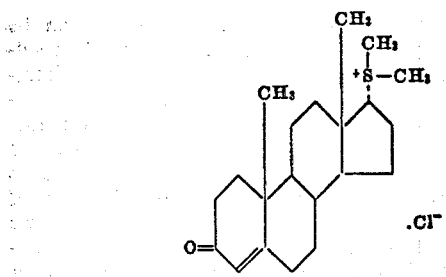

Example 3

A solution of 6 parts of 17β-methylthio-4-androsten-3-one, 200 parts of methanol and 220 parts of methyl iodide is heated under reflux in a nitrogen atmosphere for 3 hours, after which it is concentrated to dryness under reduced pressure. Excessive heating is avoided. The residue is purified by crystallization from mixtures of methanol and anhydrous ether and then from a mixture of methanol and butanone to afford 17β-methylthio-4-andosten-3-one methiodide which melts at about 134–135° C.

Example 4

By the procedure of Example 3, with the substitution of 190 parts of ethyl iodide for the methyl iodide, there is obtained 17β-ethylthio-4-androsten-3-one methiodide.

Example 5

A solution prepared from 7.5 parts of 17β-methylthio-5-androsten-3β-ol, 80 parts of butanone and 85 parts of methyl bromide is placed in a tightly sealed reaction vessel, and allowed to stand for 18 hours at about 65° C. The crystalline mass is collected on a filter and washed with anhydrous ether. Crystallizations of this product from a mixture of absolute ethanol and anhydrous ether and then from water afford 17β-methylthio-5-androsten-3β-ol methobromide melting at about 178-179° C. with decomposition.

Example 6

A solution prepared from 5 parts of 17β-methylthio-4-androsten-3-one, 50 parts of butanone and 85 parts of methyl bromide is placed in a tightly sealed reaction vessel, and allowed to stand for 24 hours at about 65° C. The insoluble reaction product is then collected on a filter and purified by recrystallization from a mixture of absolute ethanol and anhydrous ether and then from water. This product is 17β-methylthio-4-androsten-3-one methobromide. It melts at about 183–184° C.

Example 7

By the procedure of Example 6, with the substitution of 5 parts of 17α-methylthio-4-androsten-3-one for the 17β-methylthio-4-androsten-3-one, there is obtained 17α-methylthio-4-androsten-3-one methobromide.

Example 8

A solution of 9.3 parts of 3β-hydroxy-5-androstene-17β-thiol in 240 parts of methanol containing 1.6 parts of sodium methoxide is treated by the addition of 6 parts of propyl iodide, and the resulting mixture is heated under reflux for 30 minutes. The cooled mixture is then filtered, and the filtrate is diluted with water until separation of the insoluble reaction product is complete. This product is collected and recrystallized from aqueous methanol to afford purified 17β-propylthio-5-androsten-3β-ol which melts at about 127–129° C. and has the structural formula

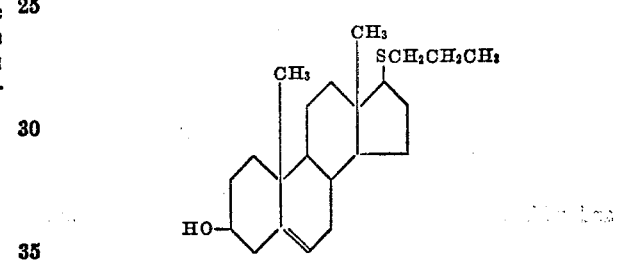

Example 9

A solution of 4 parts of 17β-propylthio-5-androsten-3β-ol, 105 parts of methanol and 135 parts of methyl iodide is heated under reflux in a nitrogen atmosphere for about 10 hours, after which it is rapidly diluted with 1700 parts of anhydrous ether. The crystalline product is collected on a filter and recrystallized from a mixture of methanol and ether to afford 17β-propylthio-5-androsten-3β-ol methiodide. This composition shows a melting point, variable with the rate of heating, of approximately 150° C., and a specific rotation of about −49.4° in methanol solution. Infrared absorption maxima are observed at about 2.93, 6.87, 6.98, 7.14, 9.48, 10.44, and 13.58 microns.

Example 10

A solution of 46 parts of 17β-methylthio-4-androsten-3-one methiodide in 20,000 parts of water is mixed with a solution of 15.6 parts of silver sulfate in 2500 parts of water, and the precipitated silver iodide is removed by filtration. The filtrate is concentrated to about 3–4% of its original volume and diluted with 35,000 parts of acetone. The solid product which precipitates is collected on a filter and recrystallized by dissolving it in a minimum quantity of water and diluting with acetone. The product thus obtained is the sulfonium sulfate (3-oxo-4-androsten-17β-yl)dimethylsulfonium sulfate which melts at about 158–160° C. and has the structural formula

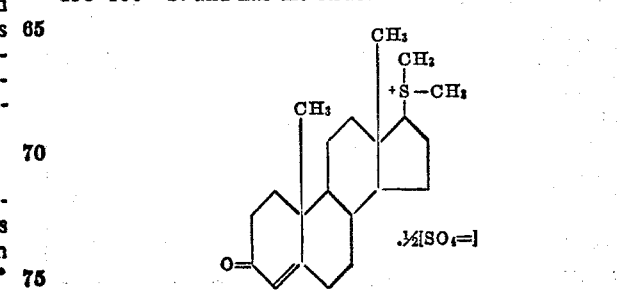

What is claimed is:
1. A member of the group consisting of compounds of the structural formula

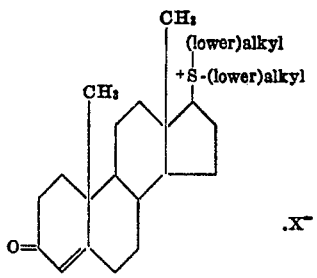

and compounds of the structural formula

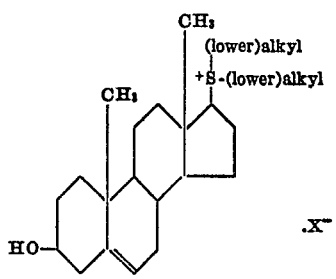

wherein X⁻ is one equivalent of a non-toxic anion.

2. 17β-(lower)alkylthio - 4 - androsten - 3 - one methohalide.
3. 17β-(lower)alkylthio - 4 - androsten - 3 - one methobromide.
4. 17β-methylthio-4-androsten-3-one methobromide.
5. 17α-(lower)alkylthio - 4 - androsten - 3 - one methohalide.
6. 17α-(lower)-alkylthio-4 - androsten - 3 - one methobromide.
7. 17α-methylthio-4-androsten-3-one methobromide.
8. 17β-(lower)alkylthio - 5 - androsten - 3β - ol methohalide.
9. 17β-(lower)alkylthio - 5 - androsten - 3β - ol methobromide.
10. 17β-methylthio-5-androsten-3β-ol methobromide.
11. 17α-(lower-alkylthio - 5 - androsten - 3β - ol methohalide.
12. 17α-(lower)alkylthio-5 - androsten - 3β - ol methobromide.
13. 17α-methylthio-5-androsten-3β-ol methobromide.

References Cited in the file of this patent
UNITED STATES PATENTS

| | | |
|---|---|---|
| 2,753,361 | Dodson et al. | July 3, 1956 |
| 2,763,669 | Dodson et al. | Sept. 18, 1956 |

OTHER REFERENCES

Fieser and Fieser: Organic Chemistry, 3rd ed. (1956), Reinhold Publ. Corp., p. 140.